(12) United States Patent
Joung (10) Patent No.: US 10,012,743 B2
(45) Date of Patent: Jul. 3, 2018

(54) PORTABLE RADIATION DETECTION SYSTEM

(71) Applicant: NuCare, Inc., Incheon (KR)

(72) Inventor: Jinhun Joung, Incheon (KR)

(73) Assignee: NUCARE, INC., Incheon (KR)

( * ) Notice: Subject to any disclaimer, the term of this patent is extended or adjusted under 35 U.S.C. 154(b) by 324 days.

(21) Appl. No.: 15/371,793

(22) Filed: Dec. 7, 2016

(65) Prior Publication Data

US 2018/0156929 A1    Jun. 7, 2018

(51) Int. Cl.

| | |
|---|---|
| *G01T 3/00* | (2006.01) |
| *G01T 1/36* | (2006.01) |
| *G01T 7/12* | (2006.01) |
| *H04W 4/02* | (2018.01) |
| *G01T 1/17* | (2006.01) |
| *G01T 7/02* | (2006.01) |

(52) U.S. Cl.
CPC ............... *G01T 3/001* (2013.01); *G01T 1/17* (2013.01); *G01T 1/36* (2013.01); *G01T 7/02* (2013.01); *G01T 7/12* (2013.01); *H04W 4/02* (2013.01)

(58) Field of Classification Search
CPC .. G01T 3/001; G01T 1/17; G01T 1/36; G01T 7/02; G01T 7/12
See application file for complete search history.

(56) References Cited

U.S. PATENT DOCUMENTS

| | | | | |
|---|---|---|---|---|
| 5,119,203 | A  * | 6/1992 | Hosaka | ................ H04N 5/2251 |
| | | | | 248/179.1 |
| 5,323,195 | A  * | 6/1994 | Phillips | .................. F16M 13/04 |
| | | | | 348/E5.025 |
| 7,263,379 | B1 * | 8/2007 | Parkulo | .................. G08B 21/02 |
| | | | | 340/501 |
| 2016/0173610 | A1 * | 6/2016 | Parkulo | ................ G08B 25/016 |
| | | | | 340/573.1 |

* cited by examiner

*Primary Examiner* — Casey Bryant
(74) *Attorney, Agent, or Firm* — Levenfeld Pearlstein, LLC

(57) ABSTRACT

A hand-held portable radiation detection device, such as a radiation isotopic identification device (RIID), is integrated with a personal digital assistant device (PDA), such as a smart phone, to provide improved data processing capability and user interface. The hand-held portable radiation detection device includes a mounting unit for holding the PDA, in which at least one function of the PDA may be controlled by a plurality of buttons provided on an outer casing of the radiation detection device.

20 Claims, 5 Drawing Sheets

PORTABLE RADIATION DETECTION SYSTEM

BACKGROUND

The present disclosure relates to radiation detection systems, and more particularly a portable radiation detection system.

Portable radiation detecting devices include Spectroscopic Personal Radiation Detectors (SPRDs) and Radiation Isotopic Identification Devices (RIIDs). These devices are configured to meet the standards for such devices as defined by the Institute for Electrical and Electronic Engineers (IEEE) and accredited by the American National Standards Institute (ANSI). Also included are spectroscopic backpack devices, which can be carried by a user in a backpack configuration and detect gamma-ray radiation and identify radiation generating radionuclides.

RIIDs detect gamma-ray radiation and provide information about radiation strength as well as gamma-ray spectroscopic information. The gamma-ray spectroscopic information is analyzed by an analysis software to read the spectrographic "fingerprint" of radiation produced in order to identify the gamma-ray emitting radionuclides present in the object under examination. RIIDs are often equipped with neutron detectors.

SPRDs are small devices that can be worn by an operator (e.g. on the belt or in the pocket). SPRDs detect gamma-ray radiation and provide information about radiation strength as well as gamma-ray spectroscopic information. The gamma-ray spectroscopic information may be used to provide identification of radionuclides. SPRDs may also be equipped with neutron detectors. The SPRD is in a smaller format than the RIID and has a correspondingly smaller detector, and thus, has a limited sensitivity when compared to a RIID RIIDs may be used for Homeland Security applications to detect radiation and other radiation measurement applications, such as nuclear power plants, border control (border police), cargo inspection, emergency response, nuclear medicine, metal reprocessing, and more.

Conventional RIIDs deploy a "one box" system approach. The "one box" system may include a radiation detection subsystem(s) for detecting radiation and generating digital data of the detected radiation, and a data processing subsystem(s) for processing the data generated by the radiation detection subsystem(s). The design of such a radiation detection subsystem(s) requires expertise in radiation measurement instrumentation. The data processing subsystem(s) is often configured to provide a user interface, a means for communication, and/or a visual display for displaying data. As such, the data processing subsystem(s) may include components, such as a display(s), digital processing unit(s), data storage unit(s), keypads, control devices, communication unit(s), and other necessary components to support the system operation.

Thus, makers of such an "one-box" RIID system are required to integrate individual components and subsystems to enable necessary functions within the "one-box" system. However, the current market size for RID systems is only measured in hundreds of units per year. Therefore, the "one-box" RIID systems do not have the scale of manufacture to drive cost-effective designs for powerful computing, display, and communication features. Further, ruggedness, portability, improved and standardized connection to computer systems, computing power to enable enhanced algorithms for better radiation detection and radionuclide identification, enhanced and standardized communications, standardized and user-friendly user interface and controls are highly desirable characteristics for these instruments. Therefore, there is a need for an affordable RIID system including improved user interface, computing and communication functions.

BRIEF SUMMARY

The current size of the market for personal digital assistants (PDAs) and similar units are measured in millions of units per year. This large market revenue results in PDAs, smart phones, and similar devices that are thoroughly engineered to be rugged, highly portable, powerful in computing power, low in power consumption, flexible in operation, and low in cost. These units also possess highly developed user interfaces that are familiar to the general public and communications that are standardized and flexible. Thus, handheld portable radiation detection systems including a commercially available PDA integrated therein are provided according to various embodiments to provide improved user interface and data processing capability, such as spectrum analysis and specific radionuclide identification. The research for the present disclosure was partially supported by Korea Institute of Energy Technology Evaluation and Planning (KETEP) and the Ministry of Trade, Industry & Energy (MOTIE) of the Republic of Korea (No. 2016150302180).

In one aspect, a portable radiation detection system including a radiation detection subsystem and a PDA is provided. The radiation detection subsystem may include radiation detection system components housed in an outer casing, which includes a mounting unit and a handle. The PDA may be configured to communicate with the radiation detection subsystem. The radiation detection system components may include at least one radiation detector configured to detect radiation and generate electronic signals, a first signal processing unit configured to process the electronic signals and generate digitized data, and a first communication unit configured to transmit the digitized data. The PDA may include a second signal processing unit configured to process the digitized data received from the radiation detection subsystem, a user interface unit, and a second communication unit configured to communicate with the first communication unit to receive the digitized data. The mounting unit may be arranged in a front section of the outer casing and include a recessed portion for holding the PDA. The recessed portion may be arranged to face the handle at a raised position, such that at least a portion of the recessed portion is arranged vertically above the handle. The mounting unit may be configured to allow a user to look down and view a screen of the PDA when holding the portable radiation detection system by the handle. Further, the radiation detection subsystem may include at least one device configured to control at least one function of the PDA.

In an embodiment, the mounting unit may be arranged tilted from a vertical axis. The at least one device may include a plurality of buttons, which are configured to execute the at least one function of the PDA. The plurality of buttons may be arranged in a front section of the handle, such that a user may control corresponding PDA functions by pressing the plurality of button using a thumb when holding the portable radiation detection system by the handle. Further, the outer casing may include a power switch, which is configured to turn on or off the radiation detection subsystem and the PDA simultaneously.

In some embodiments, the PDA may be connected to the radiation detection subsystem via at least one USB cable, in which the first communication unit and the second communication unit are configured to communicate with each other to transmit and receive data between the radiation detection subsystem and the PDA via the at least one USB cable. Further, the PDA may be charged by a power source housed in the outer casing, in which the at least one USB cable may be configured to transmit data and power. The portable radiation detection system may also be configured to allow the PDA to connect to an external device via a USB port arranged on the outer casing. Further, the portable radiation detection system may be configured to allow the PDA to connect to an external device and/or the radiation detection subsystem via a USB switch. Furthermore, the radiation detection subsystem may be configured to automatically connect to the PDA when an external computer is connected to the radiation detection subsystem.

In an embodiment, the PDA may include a touch screen function. In such an embodiment, the at least one function of the PDA may be executed by using the touch screen or the at least one device. Further, the PDA may be configured to connect to a speaker provided on the outer casing. In some embodiments, the PDA may be permanently embedded in the mounting unit.

In an embodiment, the at least one radiation detector may include a gamma-ray detector having gamma-ray spectroscopic radiation measurement capability, a gas tube based gamma detector for measuring high count-rate gamma-ray radiation, and a neutron detector for measuring neutron radiation. Further, the radiation detection subsystem may further include a high voltage module configured to supply high voltage power to the at least one radiation detector. The second signal processing unit may be configured to perform spectroscopic analysis, radionuclide identification process, and database management function. Further, the second signal processing unit may generate event log files after processing the digitized data received from the radiation detection subsystem through the spectroscopic analysis and the radionuclide identification process. The event log files may be transmitted to a remote computer system for consolidated analysis and management of data from multiple portable radiation detection systems.

The user interface unit may include a keypad, a display and a camera. The PDA may be configured to receive user input via the user interface unit, and generate and transmit signals to the radiation detection subsystem to control configurations of the radiation detection subsystem including calibration, background measurement, stabilization, and configuration parameter setup.

In some embodiments, the radiation detection subsystem may also include a calibration aid unit and a laser unit for guiding measuring direction.

In any of the foregoing embodiments, the radiation detection subsystem may be a radiation isotopic identification device (RIID). The PDA may be a smart phone.

Other aspects, objectives and advantages will become more apparent from the following detailed description when taken in conjunction with the accompanying drawings.

BRIEF DESCRIPTION OF THE SEVERAL VIEWS OF THE DRAWINGS

The benefits and advantages of the present embodiments will become more readily apparent to those of ordinary skill in the relevant art after reviewing the following detailed description and accompanying drawings, wherein.

DETAILED DESCRIPTION

While the present disclosure is susceptible of embodiment in various forms, there is shown in the drawings and will hereinafter be described a presently preferred embodiment with the understanding that the present disclosure is to be considered an exemplification and is not intended to limit the disclosure to the specific embodiment illustrated.

Figure 1:
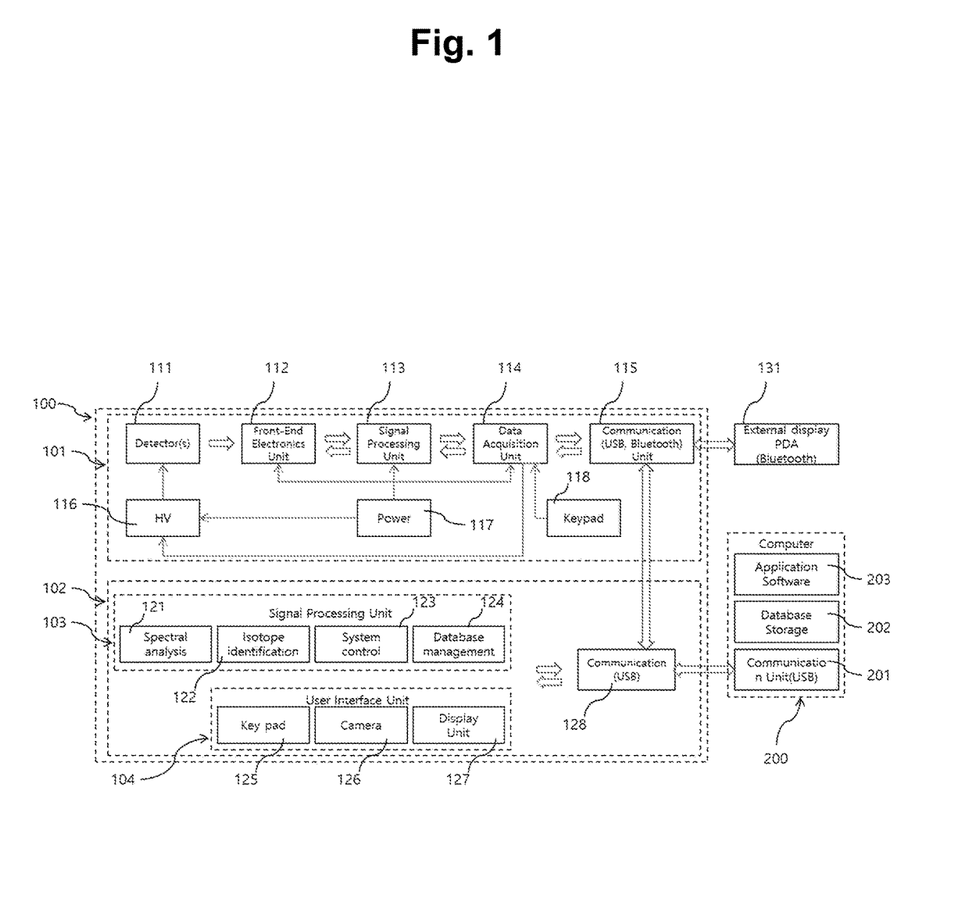
FIG. 1 is a schematic diagram of a portable radiation detection system including a radiation detection subsystem and a PDA according to an embodiment.

Referring to FIG. 1, a schematic diagram of a hand-held portable radiation detection system 100 according to an embodiment is provided. The hand-held portable radiation detection system 100 generally includes two major subsystems, namely, a radiation detection subsystem 101 and a personal digital assistant (PDA) 102, such as a smart phone or other similar devices. The radiation detection subsystem 101 may generally include at least one radiation detector 111, a front-end electronics unit 112, a signal processing unit 113, a data acquisition unit 114, a communication unit 115 such as a Bluetooth unit and USB, a high voltage power module 116, a power unit 117, and function keypad 118. The PDA 102 may generally include a PDA signal processing unit 103, a user interface unit 104, and a communication unit 128. The PDA signal processing unit 103 may be configured to perform spectral analysis 121, isotope identification 122, system control 123, and database management 124. The user interface unit 104 may include a function keypad interface 125, a camera interface 126, and a display interface 127. The detector subsystem 101 and the PDA unit 102 may communicate via the communication units 115 and 128. A computer system 200 may be provided as a supplementary subsystem for data storage, consolidated management and analysis of data from multiple hand-held portable radiation measurement systems. The computing system 200 may include an application software 203, a database storage 202, and a communication unit 201. An optional supplementary external display 131 may be configured to project the PDA display unit 127.

FIGS. 2-5 show an embodiment of a hand-held portable radiation detection system 10. The hand-held portable radiation detector system 10 may generally include a radiation detection subsystem 12 and a PDA 14. The radiation detection subsystem 12 may generally include an outer casing 16 for housing internal system components, a calibration aid 80, and a neutron detector 40. A handle 50 may be integrally formed with the outer casing 16, and shoulder strap holders 51 may also be provided for connecting a shoulder strap (not shown.)

Figure 3:
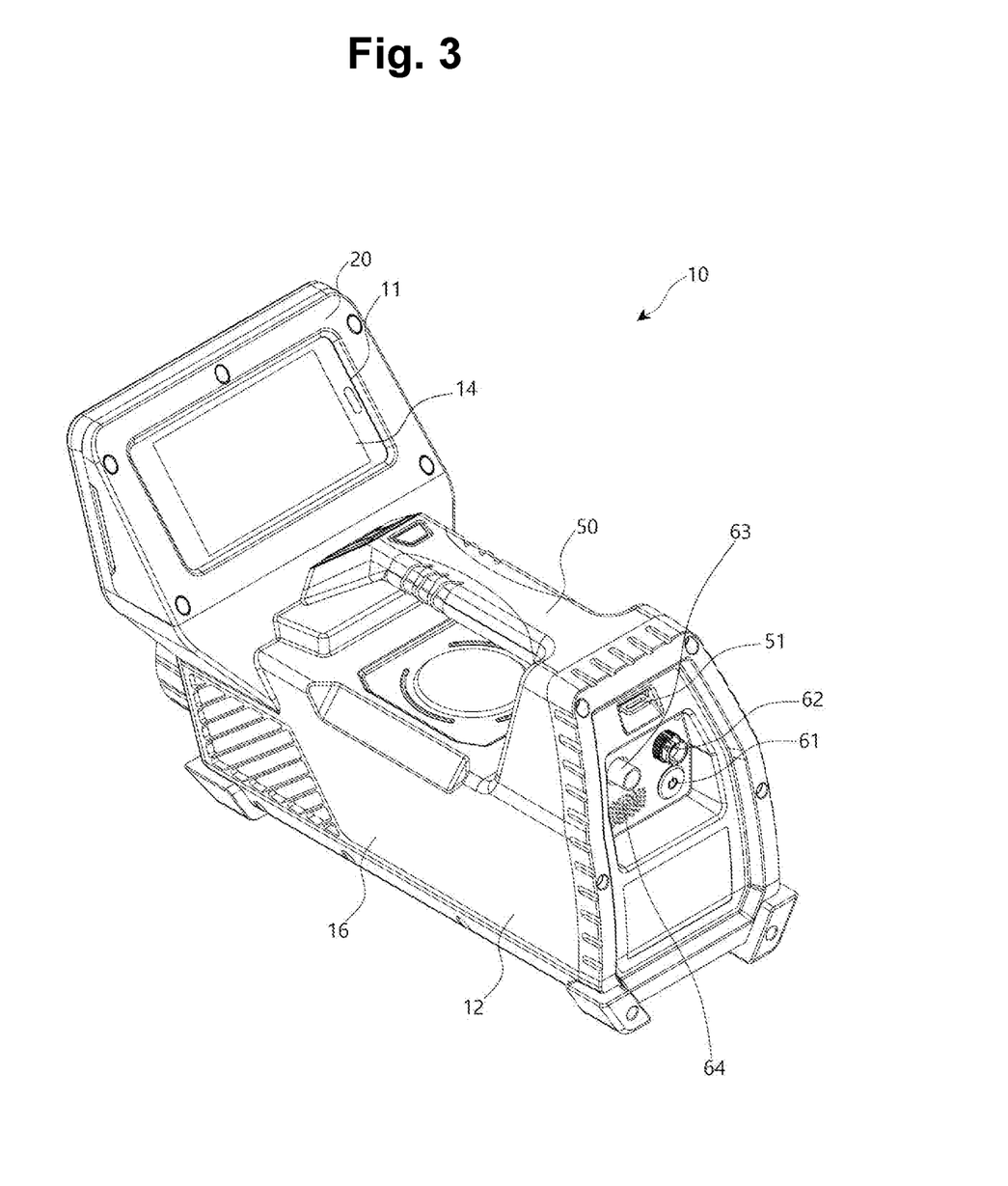
FIG. 3 is a top, rear perspective view of the portable radiation detection system of FIG. 1.

The mounting unit 20 may include a recessed portion 11 for holding the PDA 14 as shown in FIG. 3. The calibration aid 80 is a supplementary unit, and may include a removable potassium chloride (KCl) container, which may be used for system calibration. Further, the radiation detection subsystem 12 may include a power switch 61, a power charger 62, a USB port 63, and a speaker 64 arranged in a rear section of the outer casing 16.

The radiation detection subsystem 12 may be configured as a RED system and comprise RIID components (not shown) including at least one radiation detector contained within the outer casing 16. In an embodiment, the radiation detection subsystem 12 may comprise multiple radiation detectors housed in the outer casing 16 including an internal gamma-ray detector having gamma-ray spectroscopic radiation measurement capability, a gas tube based gamma detector, such as GM (Geiger Muller) tube for high count-rate gamma-ray radiation dose rate measurement, and a neutron detector for neutron radiation measurement.

Further, the radiation detection subsystem 12 may include a battery, a high voltage module, a front-end electronic module, a signal processing unit and a wireless communication module, which may also be arranged in the outer casing 16. The rechargeable battery may be a power source of the radiation detection subsystem 12. The high voltage module may be configured to supply high voltage power to the radiation detectors for their operation. The front-end electronics module and the signal processing unit may be configured to process electronic signals, which are generated by the radiation detectors when radiation is detected, and generate digitized data. The digitized data may be transmitted through the wireless communication module to the PDA 14.

In an embodiment, the PDA 14 may be configured to receive the digitized data from the radiation detection subsystem 12 via a communication unit, such as a Bluetooth communication. In another embodiment, the PDA 14 may be connected to the signal processing unit via a USB cable to receive the digitized data from the radiation detection subsystem 12. The digitized data may be processed in an internal signal processing unit in the PDA 14, which is configured to perform spectrum analysis, radionuclide identification and database management. In addition, the PDA 14 may provide an advanced graphical user interface using built in features such as a keypad, a camera and a display. The data processed by the PDA 14 may be further transferred to a separate computer system for data storage, consolidated management and analysis of data from multiple hand-held portable radiation measurement systems.

The data processing functionality and user interface functionality of the hand-held portable radiation detection system 10 may be greatly enhanced by the integration of the PDA 14. For example, in performing spectroscopic analysis, the PDA 14 provides high computing power while maintaining a low cost and a small form-factor. This enables implementation of high computing powered algorithms driving real-time performance, such as radio isotope identification for single and/or multiple mixtures of radiation sources, and analysis of data acquired to report results. Further, the PDA 14 may have a relatively large memory. For example, the size of random-access memory (RAM) may be few tens and hundreds of gigabyte (Gbyte), and thus, data may be stored for days or months without data backup to external storages.

The PDA 14 may include a relatively high resolution and high contrast display with thoroughly engineered touch screen features to provide a greatly enhanced user interface for displaying and taking user inputs. For example, a user may use the PDA 14 to input and control configurations of the radiation detection subsystem 12, such as calibration, background measurement, stabilization, and configuration parameter setup. The PDA 14 may also display radiation information including spectrum, count rate, dose rate, radionuclide identification results via the enhanced graphic user interface.

The PDA 14 may also be configured to utilize Bluetooth, and wireless and/or USB protocols to receive data from the radiation detection subsystem 12 and to transmit the processed data to a remote computing system with a high throughput. The PDA 14 may also provide code division multiple access (CDMA) protocol, which is standardized communication protocols presented in a low-power and low-cost format in sending e-mail, text message, phone call to staffs and/or command center. Further, the PDA may be configured to transmit data to a commend center or reachback center in real time via WiFi or CDMA.

The PDA 14 may be configured to utilize a built-in global positioning system (GPS) to generate event log files including corresponding location information for radiation detected by the radiation detection subsystem 12, and generate a radiation map, or transmit the date real-time to a command center for generating an event map. Further, a built-in high-resolution camera in the PDA 14 can be used to take photos and/or videos of a target object and surrounding environment, which can be saved in an event log file and/or transmitted to the command center for the event map. Further, audible/visible, mute and vibration combined alarm features of the PDA 14 may provide enhanced user alert and flexible choice for covert search conditions.

Upgrades and performance enhancement implementations for data processing functions of the hand-held portable radiation detection system 10 are greatly simplified with the integration of a PDA. Such upgrades and enhancements may be implemented in a new PDA, smart phone or similar device, which can simply replace an existing PDA. This provides a much lower cost upgrade path than such upgrades for traditional portable hand-held radiation detection systems.

In an embodiment, the PDA 14 may be removably mounted in the mounting unit 20, and may be removed from the mounting unit 20 and carried in a pocket when necessary (e.g. covert search) or convenient.

Alternatively, the PDA 14 may be permanently embedded in the mounting unit 20 and physically connected to the radiation detection subsystem 12 via a wire and/or cable. For example, the PDA 14 may be connected to the radiation detection subsystem 12 via at least one USB cable. In such an embodiment, the radiation detection subsystem 12 may include a voltage converter to convert the voltage of a power source in the radiation detection subsystem 12 to provide a voltage required for charging the PDA 14. For example, the voltage converter may convert 7.4V of a battery in the radiation detection subsystem to 5V required to charge the PDA 14. In such an embodiment, the same USB cable may be used to transmit both data and power from the radiation detection subsystem 12 to the PDA 14.

Figure 2:
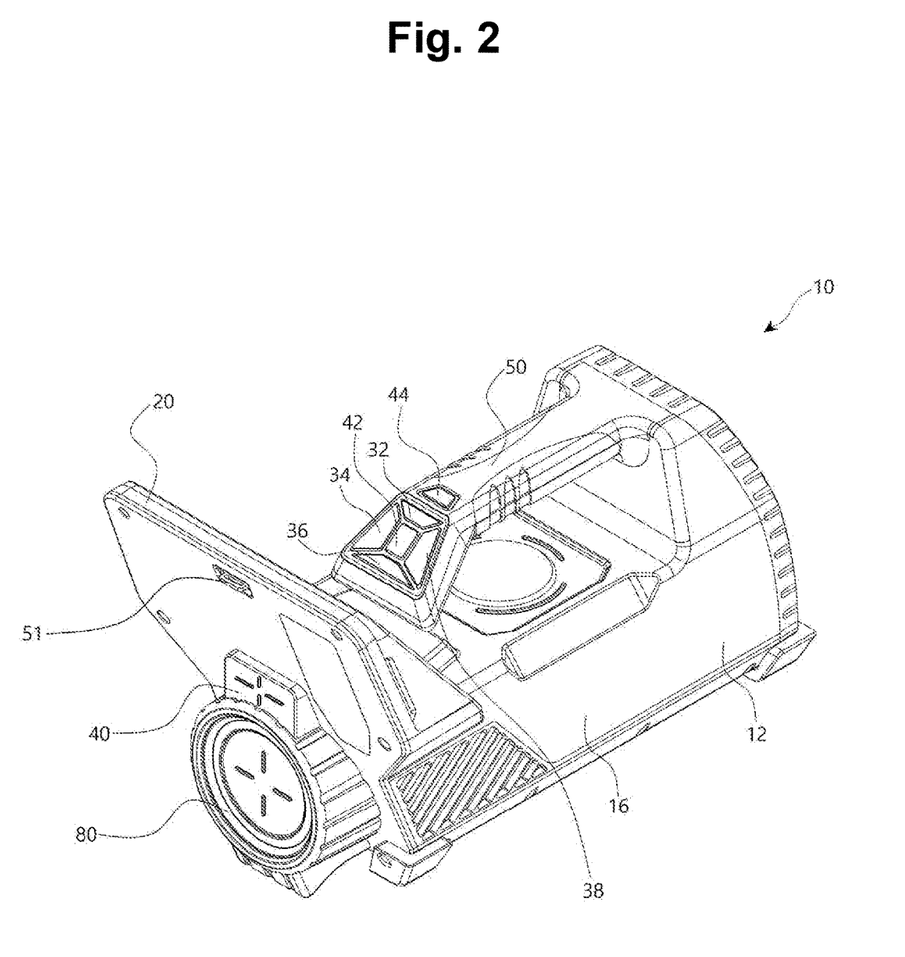
FIG. 2 is a top, front perspective view of a portable radiation detection system including a PDA according to an embodiment.

In an embodiment, the hand-held portable radiation detection system 10 may be configured such that at least one function of the PDA 14 may be controlled from the radiation detection subsystem 12. For example, the PDA 14 and the radiation detection subsystem 12 may be turned on and off simultaneously by using the power switch 61 arranged in a rear section of the radiation detection subsystem 12. The radiation detection subsystem 12 may also include at least one button or key pad for controlling at least one function of the PDA 14. In the embodiment of FIGS. 2 and 3, six buttons 32, 34, 36, 38, 42, 44 are provided in a front section of the handle 50 to control selected functions of the PDA 14, such that a user may execute the functions by pushing the buttons or using a touch screen on the PDA 14. For example, the buttons 32, 36 may be programmed as up and down buttons, the buttons 34, 38 may be programmed as left and right buttons, the button 42 may be programmed as an enter button, and the button 44 may be programmed as a back button. In some embodiments, a button may be programmed for more than one function. For example, the button 36 may be programmed as an up button for a click and as a light on/off button for a long click.

Figure 4:
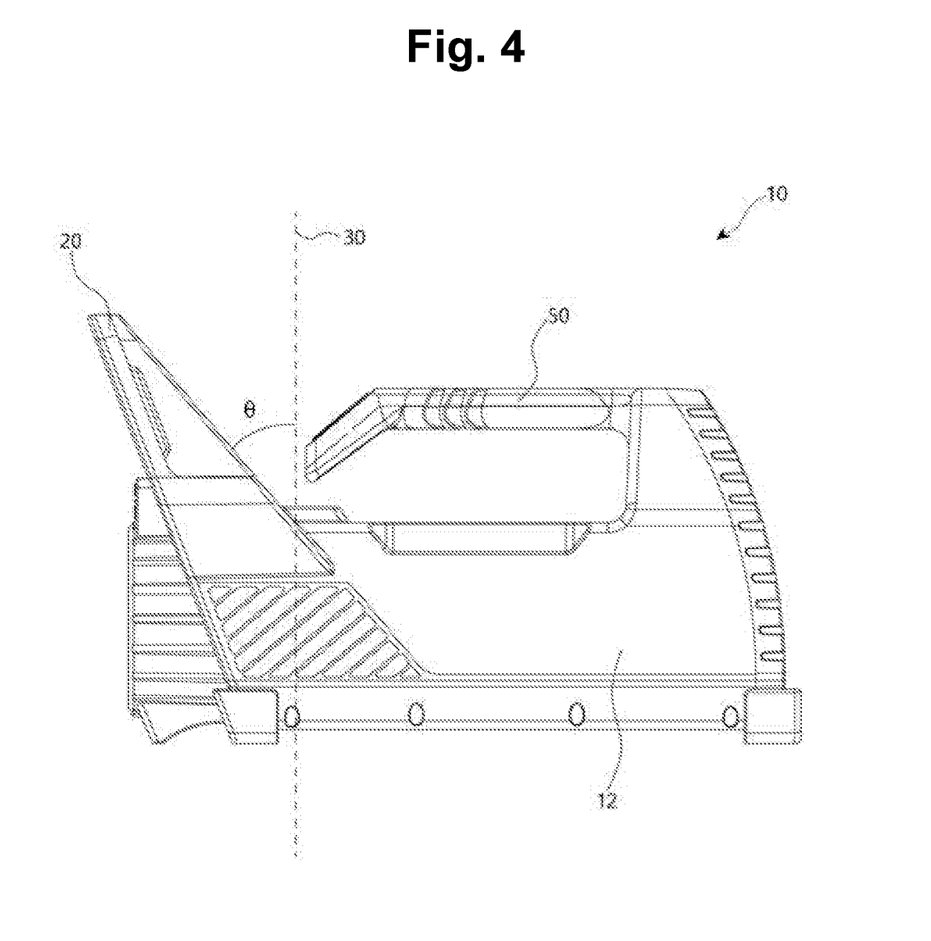
FIG. 4 is a side view of the portable radiation detection system of FIG. 1.
Figure 5:
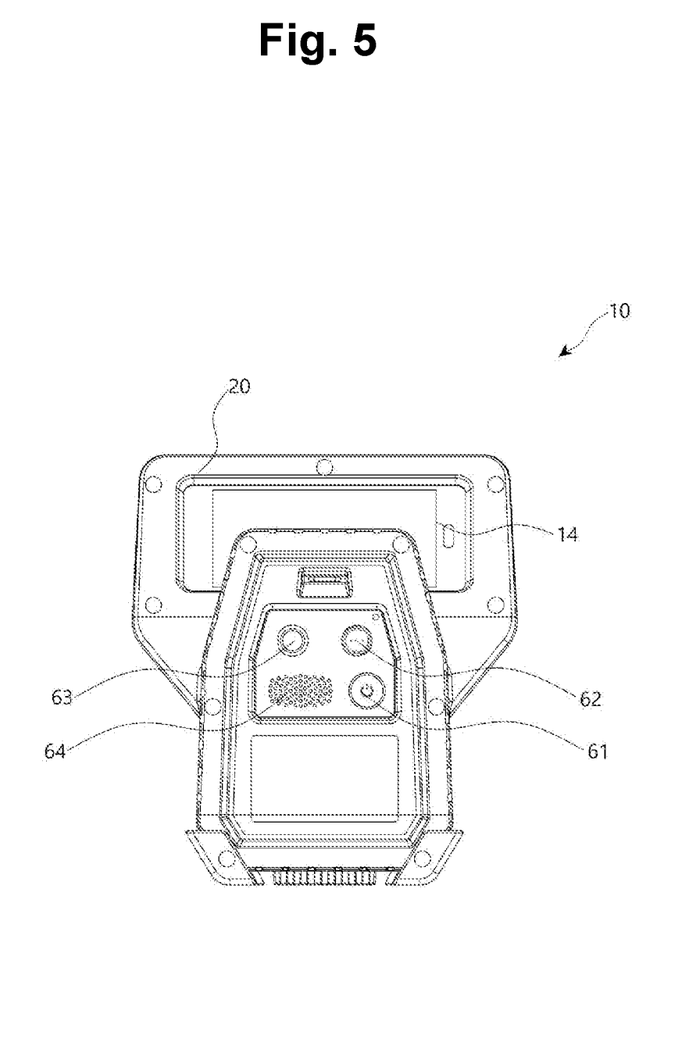
FIG. 5 is a rear view of the portable radiation detection system of FIG. 1.

The mounting unit 20 may be arranged in a front section of the hand-held portable radiation detection system 10, such that the recessed portion 11 is positioned to face the handle 50 at an elevated position. In the embodiment of FIGS. 2-5, the mounting unit 20 is arranged, such that at least a portion of the PDA 14 is visible above the handle 50 as shown in FIG. 5, and the PDA 14 is held in a slightly tiled position from a vertical axis 30 at an angle θ as shown in FIG. 4. For example, the mounting unit 20 may be arranged at an angle θ of about 10° to about 90°, preferably about 20° to about 70°, more preferably about 30° to about 50°. In an embodiment the mounting unit 20 may be arrange at an angle θ of about 40°. Such a configuration of the mounting unit 20 allows a user to view a screen of the PDA 14 when holding the radiation detection system 10 by the handle 50.

Further, the radiation detection system 10 may be configured such that the PDA 14 may connect and communicate with an external device, such as a computer via the USB port 63 arranged in the rear section of the radiation detection subsystem 12. The PDA 14 may also be connected to an external speaker 64 arranged in the rear section of the radiation detection subsystem 12.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A portable radiation detection system, comprising:
    a radiation detection subsystem including radiation detection system components housed in an outer casing, the outer casing including a mounting unit and a handle; and
    a personal digital assistant (PDA) configured to communicate with the radiation detection subsystem;
    wherein the radiation detection system components comprise:
        at least one radiation detector configured to detect radiation and generate electronic signals;
        a first signal processing unit configured to process the electronic signals and generate digitized data;
        a first communication unit configured to transmit the digitized data;
    wherein the PDA includes:
        a second signal processing unit configured to process the digitized data received from the radiation detection subsystem;
        a user interface unit;
        a second communication unit configured to communicate with the first communication unit to receive the digitized data;
    wherein the PDA is embedded in the mounting unit, and wherein the radiation detection subsystem includes at least one user control device configured to control at least one function of the PDA.

2. The portable radiation detection system of claim 1, wherein the mounting unit is arranged in a front section of the outer casing and includes a recessed portion for holding the PDA, wherein the recessed portion is arranged to face the handle at a raised position, such that at least a portion of the recessed portion is arranged vertically above the handle, and the mounting unit is configured to allow a user to look down and view a screen of the PDA when holding the portable radiation detection system by the handle.

3. The portable radiation detection system of claim 1, wherein the mounting unit is arranged tilted from a vertical axis.

4. The portable radiation detection system of claim 1, wherein the at least one user control device comprises a plurality of buttons, wherein the plurality of button are configured to execute the at least one function of the PDA.

5. The portable radiation detection system of claim 4, wherein the plurality of buttons are arranged in a front section of the handle to allow a user to execute the at least one function of the PDA by pressing the plurality of button using a thumb when holding the portable radiation detection system by the handle.

6. The portable radiation detection system of claim 1, wherein the outer casing includes a power switch, wherein the power switch is configured to turn on or off the radiation detection subsystem and the PDA simultaneously.

7. The portable radiation detection system of claim 1, wherein the PDA is connected to the radiation detection subsystem via at least one USB cable, wherein the first communication unit and the second communication unit are configured to communicate with each other to transmit and receive data between the radiation detection subsystem and the PDA via the at least one USB cable.

8. The portable radiation detection system of claim 7, wherein the PDA is charged by a power source housed in the outer casing, such that the PDA is configured to operate for the same duration as the radiation detection subsystem powered by the power source, wherein the at least one USB cable is configured to transmit both data and power.

9. The portable radiation detection system of claim 7, wherein the portable radiation detection system is configured to allow the PDA to connect to an external device via a USB port arranged on the outer casing.

10. The portable radiation detection system of claim 7, wherein the portable radiation detection system is configured to allow the PDA to connect to an external device and/or the radiation detection subsystem via a USB switch.

11. The portable radiation detection system of claim 7, wherein the radiation detection subsystem is configured to automatically connect to the PDA when an external computer is connected to the radiation detection subsystem.

12. The portable radiation detection system of claim 1, wherein the PDA includes a touch screen function, wherein the PDA is configured to allow a user to execute the at least one function of the PDA by using the touch screen or the at least on device.

13. The portable radiation detection system of claim 1, wherein the PDA is configured to connect to a speaker provided on the outer casing.

14. The portable radiation detection system of claim 1, wherein the at least one radiation detector includes a gamma-ray detector having gamma-ray spectroscopic radiation measurement capability, a gas tube based gamma detector for measuring high count-rate gamma-ray radiation, and a neutron detector for measuring neutron radiation.

15. The portable radiation detection system of claim 1, wherein the radiation detection subsystem further includes a high voltage module configured to supply high voltage power to the at least one radiation detector.

16. The portable radiation detection system of claim 1, wherein the second signal processing unit is configured to perform spectroscopic analysis, radionuclide identification process, and database management function, wherein the second signal processing unit generates event log files after processing the digitized data received from the radiation detection subsystem through the spectroscopic analysis and the radionuclide identification process, wherein the event log files are transmitted to a remote computer system for consolidated analysis and management of data from multiple portable radiation detection systems.

17. The portable radiation detection system of claim 16, wherein the PDA is configured to transmit the event log files to a commend center or reach-back center in real time via WiFi or CDMA.

18. The portable radiation detection system of claim 1, wherein the PDA includes a built-in global positioning system (GPS), wherein the PDA is configured to to generate event log files including corresponding location information for radiation detected by the radiation detection subsystem, and generate a radiation map.

19. The portable radiation detection system of claim 1, wherein the user interface unit comprises a keypad, a display and a camera, wherein the PDA is configured to receive user input via the user interface unit, and generate and transmit signals to the radiation detection subsystem to control configurations of the radiation detection subsystem including calibration, background measurement, stabilization, and configuration parameter setup.

20. The portable radiation detection system of claim 1, wherein the radiation detection subsystem is a radiation isotopic identification device (MID), and the PDA is a smart phone.

* * * * *